United States Patent Office 3,555,011
Patented Jan. 12, 1971

3,555,011
FLUORINE SUBSTITUTED α-AZIDO-BENZYLPENICILLINS
Bertil Åke Ekström and Berndt Olof Harald Sjöberg, Sodertalje, Sweden, assignors to Aktiebolaget Astra, Sodertalje, Sweden, a company of Sweden
No Drawing. Filed Mar. 12, 1969, Ser. No. 806,673
Claims priority, application Great Britain, Mar. 22, 1968, 14,055/68
Int. Cl. C07d 99/16
U.S. Cl. 260—239.1
7 Claims

ABSTRACT OF THE DISCLOSURE

α-Azidobenzylpenicillins substituted in the phenyl nucleus with a fluorine atom are disclosed. The compounds give much higher and more prolonged blood levels after oral administration compared to unsubstituted α-azidobenzylpenicillin and lower binding to human serum compared to chlorine-substituted α-azidobenzylpenicillins.

---

This invention relates to new antimicrobially active compounds and their preparation; in particular it relates to substituted α-azidobenzylpenicillins of the general formula

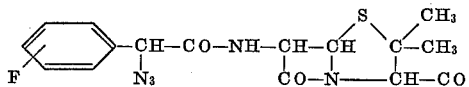

and non-toxic salts thereof, and their preparation.

The non-toxic salts of the compounds of the present invention include non-toxic metallic salts such as sodium, potassium, calcium and aluminium salts, ammonium salts and substituted ammonium salts, e.g. salts of such non-toxic amines as trialkylamines, including triethylamine, procaine, dibenzylamine, N-benzyl-β-phenethylamine, 1-ephenamine, N,N - dibenzylethylenediamine, dehydroabietylamine, N,N - bis-dehydroabietylethylenediamine, and other amines, which have been used to form salts with benzylpenicillin or phenoxymethylpenicillin.

The present invention further provides a process for preparing compounds of Formula I which process comprises reacting a compound of the formula

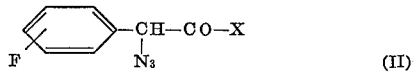

with a compound of the formula

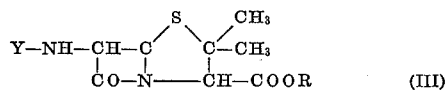

where CO—X and Y—NH are groups of atoms capable of reacting with each other with formation of a carbon-nitrogen bond so that if necessary or desired after hydrolysis a —CO—NH-group is obtained; R is a hydrogen atom, a cation or an organic radical which can be replaced by hydrogen without reduction of the azido group or any appreciable destruction of the β-lactam-thiazolidine ring system taking place.

The compound of Formula II may be an acid chloride or its functional equivalent as an acylating agent for a primary amino group. Such equivalents include the corresponding acid bromides, acid azides, activated esters, acid anhydrides, including mixed anhydrides and particularly the mixed anhydrides prepared from stronger organic acids such as the lower aliphatic monoesters of carbonic acid and mixed anhydrides prepared from inorganic acids such as dichlorophosphoric acid. In addition an activated heterocyclic amide such as an imidazolide may be used or the free acid itself may be coupled with the 6-aminopenicillanic compound of Formula III by the use of a carbodiimide reagent or other compound such as N-ethyl-5-phenylisoxazolium-3′-sulphonate, which can afford the formation of an amide upon addition to a mixture of an acid and an amine.

In the compound of Formula III, Y may be a hydrogen atom or identical to R and represents a di-(lower alkyl)- or tri-(lower alkyl)-silkyl group, the term "lower" meaning containing up to 6 carbon atoms.

According to one embodiment the compound of Formula III is 6-aminopenicillanic acid (6–APA) or a salt thereof with an inorganic base or an organic tertiary base and the reaction is carried out in water in a mixture of water and an organic solvent such as dioxane, acetone, methyl isobutyl ketone, ethyl acetate, butyl acetate or dimethylformamide, in the presence of an acid-binding agent, such as sodium hydroxide, sodium hydrogen carbonate or an organic tertiary base, e.g. triethylamine, N-ethylpiperidine or pyridine.

In another embodiment the compound of Formula III is 6–APA or a salt thereof with an organic base and the reaction is carried out in dry organic solvents such as methylene chloride or chloroform in the presence of an organic acid-binding agent such as a tertiary organic base, e.g. triethylamine or N-ethylpiperidine.

In a third embodiment of the process of the present invention the group R in the compound of Formula III is a di-(lower alkyl)-silyl or tri-(lower alkyl)-silyl radical or a tri-(lower alkyl)-tin or triaryltin radical such as those disclosed in British patent specification No. 1,144,191, e.g. tri-(n-butyl)-tin or triphenyltin and the reaction is carried out in dry organic solvents, such as methylene chloride, chloroform, ethyl acetate, tetrahydrofuran, ether, benzene, toluene and dimethylformamide. After the reaction has been completed the silyl or tin group is replaced by hydrogen by means of hydrolysis respectively reaction with a monocarbocyclic aryl thiolate in non-aqueous solution, e.g. sodium or potassium thiophenoxide in dimethylformamide, or treatment with an aqueous acid or base under mild conditions as regards pH and temperature.

According to the preferred embodiment of the process of the present invention the compound of Formula II is an acid chloride which is reacted with 6–APA in an aqueous organic solvent, such as aqueous acetone, dioxane or dimethylformamide or in a mixture of water and a water-immiscible organic solvent such as methyl isobutyl ketone, ethyl acetate or butyl acetate. After the reaction has been completed the reaction mixture is acidified to pH 2–3 and extracted with an organic solvent such as ether, ethyl acetate, butyl acetate, methyl isobutyl ketone or n-butanol. The penicillin is recovered from the organic phase by extraction with water and an inorganic base and concentrating or freeze drying the aqueous phase or by precipitation by means of sodium ethylhexanoate and filtration.

α-Azidobenzylpenicillin (Brit. Pats. 940,488, 940,489) and substituted analogues of it (British Pat. 918,169) have been used as intermediates in the preparation of the corresponding aminobenzylpenicillins. It has, however, been found that the epimer of the unsubstituted α-azidobenzylpenicillin which has D configuration on the α-carbon in the side chain, 6-[D - α - azidophenylacetamido] - penicillanic acid, has excellent antibacterial properties. (B. Sjöberg et al., Antimicrobial Agents and Chemotherapy (1967), p. 560) which makes it useful as a chemotherapeutic agent.

The value of a chemotherapeutic agent is, however, not determined only by its antibacterial potency but also by its pharmacological properties such as oral absorption, rate of excretion, and serumbinding. A good oral absorption is a very desirable property as it makes it possible to obtain satisfactory blood concentrations of the chemotherapeutic agents by the expedient oral route instead of by the more laborious and difficult parenteral route. Penicillins are bound to human serum protein to varying degrees and it has been found that their antibacterial activities diminish in proportion to their binding to the protein (Robinson and Sutherland, Brit. J. Pharmacol. 25 (1965), 638). Kunin (Clinical Pharmacology and Therapeutics 7 (1966) 166) has found that extensive binding of penicillins to serum markedly inhibits their antibacterial activity in serum and that the level of unbound drug more truly reflects the antimicrobial activity of the compound as determined in customary in vitro assays.

Although 6-[D-α-azido-phenylacetamido]penicillanic acid is absorbed by the oral route quite appreciably (L. Magni et al., Antibiotics and Chemotherapy 1967, p. 569) we have now found that the introduction of a fluorine atom into the benzene ring of the side chain surprisingly leads to compounds which give still much better blood levels after oral administration.

When the compounds prepared according to this invention were administered orally to mice all compounds were absorbed considerably better than 6-[D-α-azido-phenylacetamido]penicillanic acid. With m- and p-substituted compounds blood levels at least twice as high as those found with the unsubstituted compound were obtained. Longer duration of the blood levels was also observed.

When 6-[(—)-α-azido-m-fluorophenylacetamido]penicillanic acid was administered to humans, peak levels of the same order as those of 6-[D-α-azido-phenylacetamido] penicillanic acid were found. From two hours after the administration, however, the blood levels obtained with the fluoro compound were considerably higher than those obtained with the unsubstituted compound. Even eight hours after the administration therapeutically useful blood levels were found with the former whereas the latter gave such ones only for six hours. When 300 mg. of the sodium salt of each compound were given, the blood levels of 6-[(—)-α-azido-m-fluorophenylacetamido-penicillanic acid after eight hours were in fact significantly higher than those found with 6-[D-α-azido-phenylacetamido-penicillanic acid after six hours.

These high and prolonged blood levels are of great therapeutic and pharmaceutic value as they make it possible to reduce the doses of the compound which must be given to achieve a therapeutic effect and/or to change the dosage regimen so that fewer intakes of the drug can be made.

The antibacterial activity of the compounds of the invention are of the same order as that of the unsubstituted compound. As in case of the latter the fluoro-substituted penicillins which originate from levorotatory side chain acids are more active than their epimers obtained from the dextrorotatory acids.

The compounds of the invention are bound to human serum to about the same degree as 6-[D-α-azido-phenylacetamido]penicillanic acid. Some of the compounds are bound slightly more and some slightly less than the latter.

Compared to the unsubstituted α-azidobenzylpenicillin the unchanged antibacterial and serum binding properties of the compounds of the invention in conjunction with their unexpectedly much higher and more prolonged blood levels after oral administration thus make them to therapeutically more efficient compounds.

Other in the benzene ring halogen substituted analogues of 6-[D-α-azidophenylacetamide]penicillanic acid might possibly also give enhanced blood levels after oral administration. Their use as therapeutic agents are, however, precluded by their extensive binding to human serum. α-Azido-m-chlorobenzylpenicillin and α-azido-p-chlorobenzylpenicillin (e.g.) are bound to human serum to an extent of 98.0% and 96.5%, leaving only 2.0% and 3.5% respectively of the penicillins in free, active form.

The invention is further illustrated by the following examples.

EXAMPLE 1

Preparation of α-azido-m-fluoro-benzylpenicillin

α-Azido-m-fluorophenylacetic acid (5.9 g., 0.03 mole) was dissolved in trichloroethylene (25 ml.) and treated for 5 hours at 65° C. with thionyl chloride (5.5 g., 0.046 mole). The solvent was removed in vacuo and the excess of thionyl chloride was removed by treating the residue with fresh solvent (3 × 5 ml.) which also was distilled off in vacuo.

The final residue was dissolved in dry ether (30 ml.) and added dropwise to a stirred solution of 6-aminopenicillanic acid (6.5 g., 0.03 mole) in 75% dioxane (125 ml) kept at pH 7 by addition of 2 N sodium hydroxide. When the consumption of base ceased the reaction solution was washed with ether, acidified to pH 2 and extracted twice with ether. The combined ether extracts were washed with water and after addition of water extracted with N potassium bicarbonate (30 ml.) until the aqueous phase was neutral. Freeze drying of the latter gave the potassium salt of α-azido-m-fluorobenzylpenicillin (10 g.) with a purity of 73% (hydroxylamine assay).

α-Azido-m-fluorophenylacetic acid, M.P. 63–64° C. (Found (percent): C, 49.40; H, 3.26; F, 9.85; N, 21.26. Calcd. for $C_8H_6FN_3O_2$ (percent): C, 49.23; H, 3.10; F, 9.74; N, 21.53) was obtained from α-bromo-m-fluorophenylacetic acid, M.P. 65° C. (Found (percent): C, 41.07; H, 2.56; Br, 34.22; F, 8.33. Calcd. for $C_8H_6BrFO_2$ (percent): C, 41.23; H, 2.60; Br, 34.29; F, 8.15) by reaction with sodium azide in 95% acetone in presence of sodium carbonate.

This product was found to inhibit the growth of Staph. aureus, Oxford at a concentration of 0.01 mcg./ml.

EXAMPLE 2

Preparation of 6-[(—)-α-acido-m-fluorophenylacetamido]penicillanic acid (a) The laevorotatory enantiomer of α-azido-m-fluorophenylacetic acid (2.6 g., 0.0136 mole) in trichloroethylene (15 ml.) was treated for 5 hours at 65° C. with thionyl chloride (2.5 g., 0.021 mole). The solvent was evaporated in vacuo and the excess of thionyl chloride was removed by treating the residue with fresh solvent (3 × 5 ml.) which also was distilled off in vacuo. The final residue was dissolved in dry ether (30 ml.) an added dropwise to a stirred and ice-cooled mixture of 6-aminopenicillanic acid (2.94 g., 0.0136 mole) in 75% dioxane (125 ml.) kept at pH 7 by addition of 2 N sodium hydroxide.

After the consumption of base had ceased the mixture was diluted with water, washed with ether, acidified to pH 2 and extracted twice with ether. The combined ether extracts were washed with water and extracted with N potassium bicarbonate solution (13 ml.) until the aqueous phase was neutral. Freeze-drying of the latter gave the potassium salt of 6-[(—)-α-azido-m-fluorophenylacetamido]penicillanic acid (3.0 g.) with a purity of 63% (hydroxylamine assay). Precipitation from methanol-ether gave a product which analyzed 65% and had an $[\alpha_D]^{20}$: +157° (c.=0.1, $H_2O$).

This product was found to inhibit the growth of Staph. aureus, Oxford at a concentration of 0.03 mcg./ml.

(—)-α-Azido-m-fluorophenylacetic acid $[\alpha_D]^{20}$: −101.1° (c.=0.9, ethanol) was obtained by fractional crystallization of the pseudoephedrine salt of racemic α-azido-m-fluorophenylacetic acid from methanol/ether.

(b) To 6-aminopenicillanic acid (95.6%, 200 g., 0.885 mole) dissolved in water (15 l.) and adjusted to pH 7–7.5 by addition of 5 N sodium hydroxide 4-methyl-pentanone-2 (7.5 l.) was added and pH was adjusted to 3 by addition of 5 M sulphuric acid.

A solution of (—)-α-azido-m-fluorophenylacetyl chloride in trichloroethylene (1.07 mol/kg.; 914 g., 0.977 mole) was added at 8–11° C. during 15 minutes while the mixture was vigorously stirred and kept at pH 3 by addition of 5 N sodium hydroxide. After stirring for further 20 minutes filtered (Celite®) was added and the mixture was filtered. The organic phase was recovered and after drying over anhydrous sodium sulphate treated with 2 N butanolic sodium 2-ethylcaproate (532 ml.). After stirring for 60 minutes the precipitate formed was collected by filtration, washed thoroughly with 4-methylpetanone-2 and dried in vacuo yielding the sodium salt of 6-[(−)-α-azido-m-fluorophenylacetamido]penicillanic acid (245 g.) with a purity of 93.1% (alkalimetric assay).

A part of the product (10 g.) was recrystallized from isopropanol-water to give 8.3 g. of the compound with a purity of 94.1% and a $[\alpha_D]^{20} = +189°$, (c.=0.25, $H_2O$).

EXAMPLE 3

Preparation of 6-[(+)-α-azido-m-fluoro-phenylacetamido]penicillanic acid

Starting with the dextrorotatory enantiomer of α-azido-m-fluorophenylacetic acid (2.6 g., 0.0136 mole) and repeating the procedure of the preceeding examples the potassium salt of 6-[(+)-α-azido-m-fluorophenylacetamido]pencillanic acid (4.0 g.) with a purity of 58.3% (hydroxylamine assay) was obtained. Precipitation from methanol-ether gave a product with a purity of 65% and $[\alpha_D]^{20}$: +244° (c.=0.1, $H_2O$).

This product was found to inhibit the growth of *Staph. aureus*, Oxford at a concentration of 0.06 mcg./ml.

(+) - α - Azido - m - fluorophenylacetic acid $[\alpha_D]^{20}$: +100.4° (c.=0.25, ethanol) was obtained by fractional crystallization of the 1-ephedrine salt of racemic α-azido-m-fluorophenylacetic acid from ethyl acetate/diethyl ether/petroleum ether.

EXAMPLE 4

Preparation of α-azido-o-fluoro-benzylpenicillin

α-Azido-o-fluorophenylacetyl chloride (3.6 g., 0.017 mole) in dry dioxane (5 ml.) was added dropwise to a stirred and ice-cooled mixture of 6-aminopenicillanic acid (4.5 g., 0.02 mole) in 75% dioxane (50 ml.), the pH being maintained at 6.5 by automatic addition of 2 N sodium hydroxide. When consumption of base ceased the reaction solution was washed with ether, acidified to pH 2 and extracted three times with ether. The combined ether extracts were washed with water and after addition of water extracted with N potassium bicarbonate until the aqueous phase was neutral. Freeze-drying of the latter gave the potassium salt of α-azido-o-fluorobenzylpenicillin (5.0 g.) with a purity of 64% (hydroxylamine assay).

This product was found to inhibit the growth of *Staph. aureus*, Oxford at a concentration of 0.03 mcg./ml.

α - Azido - o - fluorophenylacetic acid, M.P. 53–4° C. (Found (percent): C, 48.88; H, 3.60; F, 9.68; N, 21.38; equiv. weight 197. Calcd. for $C_8H_6FN_3O_2$ (percent): C, 49.23; H, 3.10; F, 9.74; N, 21.53; equiv. weight, 195) was obtained from the corresponding α-bromo acid by reaction with sodium azide in 95% acetone in presence of sodium carbonate. It was converted into its acid chloride by reaction with thionyl chloride for 45 min. at 80° C.

EXAMPLE 5

Preparation of α-azido-p-fluorobenzylpenicillin (a) α-Azido - p - fluorophenylacetyl chloride (13.3 g., 0.062 mole) was added dropwise to a stirred and ice-chilled mixture of 6-aminopenicillanic acid (16.2 g., 0.075 mole) in 75% dioxane (350 ml.) maintained at pH 6.5 by automatic addition of 2 N sodium hydroxide. When consumption of base ceased the reaction solution was washed with ether, acidified to pH 2 and extracted twice with ether. The combined ether extracts were washed with water and extracted with 2 N sodium hydroxide until the aqueous phase was neutral. Freeze-drying of the latter gave the sodium salt of α-azido-p-fluorobenzylpenicillin (21.5 g.) with a purity of 78%.

This product was found to inhibit the growth of *Staph. aureus*, Oxford at a concentration of 0.06 mcg./ml.

α - Azido - p - fluorophenylacetic acid, M.P. 63–4° C. (Found (percent): C, 49.14; H, 3.52; F, 9.61; N, 21.30. Calcd. for $C_8H_6FN_3O_2$ (percent): C, 49.24; H, 3.10; F, 9.74; N, 21.53) was prepared from the corresponding α-bromo acid by treatment with sodium azide in 95% acetone in presence of sodium bicarbonate. The acid chloride, B.P. 121–122° C./8 mm., was obtained by treatment of the acid with thionyl chloride.

(b) 6-aminopenicillanic acid (1.1 g., 0.005 mole) in dry methylene chloride (50 ml.) was treated with triethylamine (1 g., 0.01 mole) and stirred for 1 hour in the ice bath. p-Nitrophenyl α-azido-p-fluorophenylacetate (1.25 g., 0.004 mole), dissolved in dry methylene chloride (10 ml.) was added and stirring was continued for 20 hours without cooling. The reaction mixture was washed twice with dilute sulphuric acid at pH 2 and then with water. The organic layer was then extracted with dilute sodium hydroxide until the aqueous phase reached pH 6.3. The aqueous solution was separated and washed with ether and then evaporated in vacuo at 30° C. to give the sodium salt of α-azido-p-fluoro-benzyl penicillin (1.25 g.) with a purity of 66% (hydroxylamine assay).

The p-nitrophenyl α-azido-p-fluorophenylacetate was obtained by treatment of the α-azido-p-fluorophenylacetic acid in methylene chloride with p-nitrophenol in presence of dicyclohexyl carbodiimide.

(c) α-Azido-p-fluorophenylacetic acid (1 g., 0.005 mole) in dry tetrahydrofurane (30 ml.) was stirred and treated with N,N′-carbonyl-diimidazole (0.9 g., 0.0055 mole) and kept for 1 hour at 50° C. After cooling to room-temperature a dimethylsilyl derivative of 6-amino-penicillanic acid in ethylacetate, obtained as described below, was added and stirring was continued for 2 hours. Water (50 ml.) was added and pH was adjusted to 7. The mixture was washed with ether and the aqueous phase was acidified to pH 2 and extracted twice with ether. The combined ether extracts were washed with water and then extracted with N potassium bicarbonate until the aqueous phase was neutral. Evaporation of the latter gave the potassium salt of α-azido-p-fluorobenzyl penicillin (1.8 g.) with a purity of 63% (hydroxylamine assay).

The dimethylsilyl derivative of 6-amino-penicillanic acid was prepared as follows: To 6-amino-penicillanic acid (1.1 g., 0.005 mole) suspended in dry ethyl acetate (30 ml.) triethylamine (1.5 g., 0.015 mole) was added with stirring at 80° C. followed by dimethyl-dichlorosilane (0.65 g., 0.005 mole), dissolved in dry ethyl acetate (5 ml.). After 5 min. the precipitate formed was removed by filtration under dry conditions and the filtrate was cooled to room-temperature and used directly for the synthesis described above.

(d) α-Azido-p-fluorophenylacetic acid (1 g., 0.005 mole) and triethylamine (0.5 g., 0.005 mole) in dry dimethylformamide (10 ml.) were stirred at −10° C. and treated dropwise with ethyl chloroformate (0.54 g., 0.005 mole) dissolved in dry ether (5 ml.) 10 min. after the addition was completed a solution of 6-aminopenicillanic acid (2.1 g., 0.01 mole) and triethylamine (1.1 g., 0.011 mole) in water (10 ml.) was added and stirring was continued for 2 hours without external cooling. The reaction mixture was washed with ether, acidified to pH 2 and extracted three times with ether. The combined ether extracts were washed with water and extracted with N potassium bicarbonate until the aqueous phase was neutral. Evaporation of the latter in vacuo at room-temperature gave the potassium salt of α-azido-p-fluoro-benzyl penicillin (1.7 g.) with a purity of 53% (hydroxylamine assay).

(e) A stirred and ice-cooled solution of α-azido-p-fluorophenylacetic acid (1 g., 0.005 mole) in dry methylene dichloride (15 ml.) was treated with an ice-cooled solution of tri-n-butyl 6-aminopenicillanate (2.5 g., 0.005 mole) in dry methylene dichloride (15 ml.) immediately followed by a likewise ice-cooled solution of dicyclohexyl carbodiimide (1.03 g., 0.005 mole) in dry methylene dichloride (7 ml.). Stirring was continued over night at $+4°$ C. Ethyl acetate (50 ml.) was added and the mixture was filtered. The filtrate was stirred with water (55 ml.) and adjusted to pH 6.5 for 10 min., filtered, dried over anhydrous magnesium sulphate and evaporated to dryness.

The residue was reprecipitated from benzene-petrolether to give 2.1 g. of product, which was dissolved in dry dimethylformamide (2.5 ml.) and treated for 30 min. with potassium thiophenolate (0.46 g.). The mixture was poured into dry ether while stirring giving a precipitate of the potassium salt of α-azido-p-fluorobenzyl penicillin (1.2 g.) with a purity of 79% (hydroxylamine assay).

(f) α-Azido-p-fluorophenylacetic acid (1 g., 0.005 mole) in dry tetrahydrofuran (25 ml.) was stirred and cooled to $-20$ to $-30°$ C. and treated dropwise with phosphorus oxychloride (0.75 g., 0.005 mole) and then with triethylamine (0.05 g., 0.005 mole) each dissolved in a few ml. of dry tetrahydrofuran. A solution of a trimethylsilyl derivative of 6–APA in tetrahydrofuran (20 ml.) prepared as described below and triethylamine (0.5 g., 0.005 mole) was added and stirring was continued for 2 hrs. first at $-10$ to $-20°$ C. and at the end of the reaction at $0°$ C. After addition of water and adjustment of the pH to 7 the mixture was washed with ether, acidified to pH 2 and extracted twice with ether. The combined ether extracts were washed with water and extracted with a N potassium bicarbonate solution until the aqueous phase was neutral. Evaporation of the latter in vacuo at room-temperature gave the potassium salt of α-azido-p-fluoro-benzyl penicillin (1.7 g.) with a purity of 39% (hydroxylamine assay).

The trimethylsilyl derivative of 6-amino penicillanic acid was prepared as follows: 6-aminopenicillanic acid (1.1 g., 0.005 mole) was treated with N-trimethylsilyl-diethylamine (3.6 g., 0.025 mole) at $80°$ C., the diethylamine formed being continuously removed by distillation. After 30 min. the excess of the silylating agent was removed in vacuo and the residue was dissolved in dry tetrahydrofuran (20 ml.) and used for the above reaction.

EXAMPLE 6

Preparation of 6-[(−)-α-azido-p-fluorophenylacetamido]penicillanic acid

The laevorotatory enantiomer of α-azido-p-fluorophenylacetic acid (4.7 g., 0.024 mole) in trichloroethylene (20 ml.) was treated 2.5 hrs. at $65°$ C. with thionyl chloride (4.4 g., 0.037 mole). Solvent and excess thionyl chloride were evaporated in vacuo and the residue was dissolved in dry ether (20 ml.) and added dropwise to a stirred and ice-chilled mixture of 6-aminopenicillanic acid (7.8 g., 0.036 mole) and 75% dioxane (75 ml.) maintained at pH 7.0 by addition of 2 N sodium hydroxide. After the consumption of base had ceased the mixture was diluted with water, washed with ether, acidified to pH 2 and extracted with ether four times. The combined ether extracts were washed with water and extracted with N potassium bicarbonate until the aqueous phase was neutral. Freeze-drying of the latter gave the potassium salt of 6-[(−)-α-azido-p-fluorophenylacetamido]penicillanic acid (6.5 g.) with a purity of 78% (hydroxylamine assay).

This product was found to inhibit the growth of *Staph. aureus*, Oxford at a concentration of 0.01 mcg./ml. Recrystallization from isopropanol/ether gave a product with a purity of 86% and $[\alpha]_D^{20} = +163°$ (c.=0.25, H$_2$O), (−)-α-Azido-p-fluorophenylacetic acid, $$[\alpha_D]^{20}: -111.0°$$

(c.=0.25, ethanol) was obtained by fractional crystallization of the ephedrine salt of racemic α-azido-p-fluorophenylacetic acid.

EXAMPLE 7

Preparation of 6-[(+)-α-azido-p-fluorophenylacetamido] penicillanic acid

In the manner described in Example 6, starting with the dextrorotatory enantiomer of α-azido-p-fluorophenylacetic acid (3.9 g., 0.02 mole) the potassium salt of 6-[(+)-α-azido-p-fluorophenylacetamido]penicillanic acid (5.5 g.) with a purity of 70% (hydroxylamine assay) and $[\alpha_D]^{20} = +279°$ (c.=0.25, H$_2$O) was obtained.

This product was found to inhibit the growth of *Staph. aureus*, Oxford at a concentration of 0.03 mcg./ml.

(+)-α-Azido-p-fluorophenylacetic acid, $$[\alpha_D]^{20}: +110°$$

(c.=0.25, ethanol), was obtained by fractional crystalization of the d-amphetamine salt of the racemic α-azido-p-fluorophenylacetic acid.

PHARMACOLOGICAL TESTS

The products prepared according to the preceding examples, 6-[D - α - azido-phenylacetamido]penicillanic acid, α-azido-m-chlorobenzylpenicillin and α-azido-p-chlorobenzylpenicillin were tested giving the results found below. The compounds are designated as follows:

I denotes 6-[(−)-α-azido-m-fluorophenylacetamido]-penicillanic acid

II denotes 6-[(+)-α-azido-m-fluorophenylacetamido]-penicillanic acid

III denotes α-azido-m-fluorobenzylpenicillin, i.e. a mixture of I and II obtained according to Example 1 from DL-α-azido-m-fluorophenylacetic acid IV denotes 6-[(−)-α-azido-p-fluorophenylacetamido]-penicillanic acid V denotes 6-[(+)-α-azido-p-fluorophenylacetamido]-penicillanic acid VI denotes α-azido-p-fluorobenzylpenicillin, i.e. a mixture of IV and V obtained from DL-α-azido-p-fluorophenylacetic acid VII denotes α-azido-o-fluorobenzylpenicillin VIII denotes 6-[D-α-azido-phenylacetamido]penicillanic acid IX denotes α-azido-m-chlorobenzylpenicillin X denotes α-azido-p-chlorobenzylpenicillin (a) Antibacterial activity (Minimum Inhibitory Concentration M.I.C. mcg./ml.).

| | Compound | | | | | | | | | |
|---|---|---|---|---|---|---|---|---|---|---|
| | I | II | III | IV | V | VI | VII | VIII | IX | X |
| Purity organism | 95 | 65 | 100 | 78 | 69 | 84 | 73 | 99 | 81 | 86 |
| Dipl. pneum | ≦0.006 | ≦0.006 | ≦0.006 | ≦0.006 | 0.01 | ≦0.006 | ≦0.006 | ≦0.006 | | ≦0.006 |
| Neiss catarrh | ≦0.006 | 0.03 | | 0.01 | 0.13 | 0.01 | 0.01 | 0.01 | | |
| Staph. aureus, Oxford | 0.01 | 0.06 | 0.01 | 0.01 | 0.03 | 0.06 | 0.03 | ≦0.006 | 0.01 | 0.01 |
| Strept. faec | 0.25 | 2.5 | 0.63 | 0.63 | 2.5 | 1.25 | 1.25 | 0.63 | 0.25 | 0.63 |
| Strept. pyo | ≦0.006 | ≦0.006 | ≦0.006 | ≦0.006 | ≦0.006 | ≦0.006 | ≦0.006 | ≦0.006 | ≦0.006 | ≦0.006 |
| Strept viridans | ≦0.006 | ≦0.006 | ≦0.006 | ≦0.006 | ≦0.006 | ≦0.006 | ≦0.006 | ≦0.006 | 0.06 | 0.03 |

(b) Degree of binding to human serum determined by an ultrafiltration technique (Robinson and Sutherland, Brit. J. Pharmacol. 25 (1965) 638).

| | Percent bound | Percent unbound |
|---|---|---|
| Compound: | | |
| I | 88.3 | 11.7 |
| II | 82.9 | 17.1 |
| III | 88.7 | 11.3 |
| IV | 81.8 | 18.2 |
| V | 85.7 | 14.3 |
| VI | 83.9 | 16.1 |
| VII | 87.3 | 12.7 |
| VIII | 84.9 | 15.1 |
| IX | 98.0 | 2.0 |
| X | 96.5 | 3.5 |

(c) Blood concentration (mcg./ml.) in mice after oral application of 200 mg. penicillin/kg. bodyweight.

| | Compound | | | | | | |
|---|---|---|---|---|---|---|---|
| | I | II | IV | V | VII | VIII | X |
| Time, min.: | | | | | | | |
| 10 | 5.2 | 11.8 | | | | | |
| 20 | 16.4 | 18.4 | 19.0 | 20.4 | 15.8 | 9.6 | 11.6 |
| 30 | 16.0 | 21.9 | | | | | |
| 40 | 21.3 | 25.9 | 26.3 | 25.7 | 16.2 | 11.4 | 25.0 |
| 50 | 23.2 | 20.9 | | | | | |
| 60 | 19.4 | 24.9 | 23.9 | 24.3 | 12.2 | 11.6 | 21.5 |
| 80 | | | 19.8 | 18.7 | 9.7 | 8.7 | 16.7 |
| 100 | | | 16.8 | 17.8 | 8.2 | 7.7 | 14.9 |
| 120 | | | 15.5 | 15.3 | 7.6 | 6.4 | 9.7 |
| 150 | | | 11.9 | 11.0 | 7.6 | 5.4 | 10.7 |
| 180 | | | 7.3 | 8.6 | 5.8 | 5.0 | 7.2 |

(d) Blood concentrations in humans.

Capsules containing sodium 6-[(−)-α-azido-m-fluorophenylacetamido]penicillanate (I, 300 mg.) were given to six healthy, fasting volunteers. Blood samples were drawn after 0.5, 1, 2, 4, 6 and 8 hours and analyzed for penicillin content. Three days later sodium 6-[D-α-azido-phenylacetamido]penicillanate (VIII, 300 mg.) were given to the same subjects under the same conditions. The following mean blood concentrations (mcg./ml.) with standard errors of mean were found.

| | Time, hr. | | | | | |
|---|---|---|---|---|---|---|
| | 0.5 | 1.0 | 2.0 | 4.0 | 6.0 | 8.0 |
| Compound: | | | | | | |
| I | 9.16 ±2.74 | 7.45 ±0.68 | 3.24 ±0.13 | 0.99 ±0.075 | 0.34 ±0.015 | 0.125 ±0.008 |
| VIII | 9.55 ±1.99 | 7.64 ±0.85 | 2.38 ±0.25 | 0.36 ±0.0032 | 0.081 ±0.0098 | <0.027 |

The differences between the mean values of the two compounds were not significant at 0.5 and 1.0 hour, but the higher blood levels observed with the fluoro compound were significant ($p \leq 0.01$) after 2.0 and 4.0 hours and highly significant ($p \leq 0.001$) after 6.0 and 8.0 hours. The 8 hr.-value for I was significantly higher than the 6 hr.-value for VIII ($p < 0.05$).

We claim:

1. A compound selected from the group consisting of

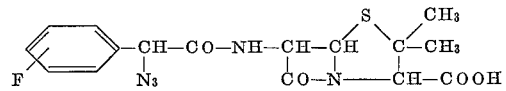

and non-toxic salts thereof.

2. The compound according to claim 1 which is in the form of an optically pure isomer.

3. A compound selected from the group consisting of racemic α-azido - m - fluorobenzyl-penicillin and its non-toxic salts.

4. A compound selected from the group consisting of racemic α-azido-m-fluorobenzyl-penicillin and its non-toxic salts.

5. A compound selected from the group consisting of racemic α-azido-p-fluorobenzyl-penicillin and its non-toxic salts.

6. A compound selected from the group consisting of 6-[(−)-α-azido - m - fluorophenylacetamido]penicillanic acid and its non-toxic salts.

7. A compound selected from the group consisting of 6-[(−)-α-azido - p - fluorophenylacetamido]penicillanic acid and its non-toxic salts.

References Cited
UNITED STATES PATENTS 3,293,242  12/1966  Sjoberg et al. _____ 260—239.1
3,362,952  1/1968   Stove et al. _____ 260—239.1

NICHOLAS S. RIZZO, Primary Examiner

U.S. Cl. X.R.

424—271

20081

PO-1050
(5/69)

UNITED STATES PATENT OFFICE
CERTIFICATE OF CORRECTION

Patent No. 3,555,011  Dated January 12, 1971

Inventor(s) Bertil Ake Ekstrom and Berndt Olof Harald Sjoberg

It is certified that error appears in the above-identified patent and that said Letters Patent are hereby corrected as shown below:

Column 1, line 53, "Y-NH-CH-C" should be --Y-NH-CH-CH--;

Column 2, line 9, "silkyl" should be --silyl--;

Column 2, line 14, after "water" insert --or--;

Column 3, lines 29-30, "penicilllanic" should be --penicillar

Column 3, lines 40 & 42, after "fluorophenylacetamide" inser

Column 5, line 4, "filtered" should be --filteraid--;

Column 5, line 10, "petanono" should be --pentanone--;

Column 7, line 20, "(0.05 g.," should be --(0.5 g.,--;

Column 7, line 68, "hyman" should be --human--;

Column 7, line 68, "Pharmaco" should be --Pharmacol--;

Column 8, line 8, "$[\alpha]_D$" should be --$[\alpha_D]$--;

Column 10, line 20, claim 3, "-m-" should be -- -o- --.

Signed and sealed this 26th day of October 1971.

(SEAL)
Attest:

EDWARD M. FLETCHER, JR.
Attesting Officer

ROBERT GOTTSCHALK
Acting Commissioner of Pat